(12) United States Patent
Ghaderi Dehkordi et al.

(10) Patent No.: US 7,512,068 B1
(45) Date of Patent: Mar. 31, 2009

(54) CALL ADMISSION CONTROL FOR A WIRELESS NETWORK

(75) Inventors: Majid Ghaderi Dehkordi, Waterloo (CA); Raouf Boutaba, Waterloo (CA); Gary Kenward, Manotick (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 692 days.

(21) Appl. No.: 10/958,170

(22) Filed: Oct. 4, 2004

Related U.S. Application Data

(60) Provisional application No. 60/585,252, filed on Jul. 2, 2004.

(51) Int. Cl.
*H04J 1/16* (2006.01)

(52) U.S. Cl. .................. 370/230; 370/252; 370/338

(58) Field of Classification Search ............. 370/229, 370/230, 231, 252, 253, 338
See application file for complete search history.

(56) References Cited

U.S. PATENT DOCUMENTS

| | | | | |
|---|---|---|---|---|
| 5,677,907 A | * | 10/1997 | Hamada et al. | 370/253 |
| 5,729,541 A | * | 3/1998 | Hamalainen et al. | 370/337 |
| 6,330,326 B1 | * | 12/2001 | Whitt | 379/265.13 |
| 6,512,918 B1 | * | 1/2003 | Malomsoky et al. | 455/403 |
| 6,748,247 B1 | * | 6/2004 | Ramakrishnan et al. | 455/574 |
| 6,853,846 B1 | * | 2/2005 | Lin et al. | 455/453 |
| 6,909,690 B1 | * | 6/2005 | Xu et al. | 370/230 |
| 7,095,841 B2 | * | 8/2006 | Mullen | 379/265.1 |
| 2002/0168970 A1 | * | 11/2002 | Myojo | 455/426 |
| 2003/0032409 A1 | * | 2/2003 | Hutcheson et al. | 455/414 |
| 2003/0202468 A1 | * | 10/2003 | Cain et al. | 370/229 |
| 2004/0047289 A1 | * | 3/2004 | Azami et al. | 370/230 |
| 2005/0068940 A1 | * | 3/2005 | Saleh et al. | 370/352 |
| 2005/0074012 A1 | * | 4/2005 | Garakani et al. | 370/395.21 |

OTHER PUBLICATIONS

M. Ghaderi, et al.; *Admission Control for Call and Packet QoS Guarantee in 3G and Beyond Cellular Networks*; School of Computer Science, University of Waterloo; pp. 1-12.
U. Varshney, et al.; *Issues in Emerging 4G Wireless Networks*; IEEE Computer, vol. 34, No. 6, pp. 94-96; Jun. 2001.
T. Zahariadis, et al.; *(R)evolution Toward 4G Mobile Communication Systems*; IEEE Wireless Commun. Mag., vol. 10, No. 4, pp. 6-7, Aug. 2003.
S.Y. Hui, et al.; *Challenges in the Migration to 4G Mobile Systems*; IEEE Commun. Mag., vol. 41, No. 12, pp. 54-59, Dec. 2003.

(Continued)

*Primary Examiner*—Ricky Ngo
*Assistant Examiner*—Kan Yuen
(74) *Attorney, Agent, or Firm*—Conley Rose, P.C.; Rodney B. Carroll; Paul Hashim

(57) ABSTRACT

A call admission method and apparatus are disclosed which maximizes the wireless channel utilization subject to a predetermined bound on the call dropping and packet loss probabilities for variable-bit-rate traffic in a packet switched network. The call admission scheme is stochastic and dynamic, hence it is able to adapt to a wide range of traffic fluctuations and mobility patterns. The call admission scheme disclosed satisfies a set of constraints on call dropping and packet loss probabilities while maintaining high bandwidth utilization.

21 Claims, 10 Drawing Sheets

OTHER PUBLICATIONS

A.W. Berger, et al.; *Extending the Effective Bandwidth Concept to Networks with Priority Classes*; IEEE Commun. Mag., vol. 36, No. 8, pp. 78-83, Aug. 1998.

Q. Gao, et al. ; *Performance Comparisons of Admission Control Strategies for Future Wireless Networks*; Proc. IEEE WCNC '02, vol. 1, Orlando, USA; p. 317-321; Mar. 2002.

D. Hong, et al. ; *Traffic Model and Performance Analysis for Cellular Mobile Radio Telephone Systems with Prioritized and Nonprioritized Handoff Procedures*; CEAS Tech. Rep. No. 773, College of Engineering and Applied Sciences, State University of New York; Jun. 1999.

R. Ramjee, et al. ; *On Optimal Call Admission Control in Cellular Networks*; Wireless Networks, vol. 3, No. 1, pp. 29-41; Mar. 1997.

M. Naghshineh, et al. ; *Distributed Call Admission Control in Mobile/Wireless Networks*; IEEE J. Select. Areas Commun., vol. 14, No. 4, pp. 711-717; May 1996.

D. Levine, et al.; *A Resource Estimation and Call Admission Algorithm for Wireless Multimedia Networks Using the Shadow Cluster Concept*; IEEE/ACM Trans. Networking, vol. 5, No. 1, pp. 1-12; Feb. 1997.

B.M. Epstein, et al.; *Predictive QoS-Based Admission Control for Multiclass Traffic in Cellular Wireless Networks*; IEEE J. Select. Areas Commun., vol. 18, No. 3, pp. 523-534; Mar. 2000.

J.M. Peha, et al. ; *Admission Control Algorithms for Cellular Systems*; Wireless Networks; vol. 7, No. 2, pp. 117-125; Mar. 2001.

B. Li, et al.; *An Efficient and Adaptive Bandwidth Allocation Scheme for Mobile Wireless Networks Using an On-line Local Estimation Technique*; Wireless Networks, vol. 7, No. 2, pp. 107-116; 2001.

K. Mitchell, et al.; *An Analysis of the Effects of Mobility on Bandwidth Allocation Strategies in Multi-class Cellular Wireless Networks*; Proc. IEEE INFOCOM '01, vol. 2, Anchorage, USA; pp. 1005-1011; Apr. 2001.

T. Zhang, et al.; *Local Predictive Resource Reservation for Handoff in Multimedia Wireless IP Networks*; IEEE J. Select J. Areas Commun., vol. 19, No. 10, pp. 1931-1941; Oct. 2001.

Y. Fang, et al.; *Call Admission Control Schemes and Performance Analysis in Wireless Mobile Networks*; IEEE Trans. Veh. Technol., vol. 51, No. 2, pp. 371-382; Mar. 2002.

S. Wu, et al.; *A Dynamic Call Admission Policy With Precision QoS Guarantee Using Stochastic Control for Mobile Wireless Networks*; IEEE/ACM Trans. Networking, vol. 10, No. 2, pp. 257-271; Apr. 2002.

W.S. Soh, et al.; *Qos Provisioning in Cellular Networks Based on Mobility Prediction Techniques*; IEEE Commun. Mag., vol. 41, No. 1, pp. 86-92; Jan. 2003.

M. Schwartz; *Broadband Integrated Networks*; Prentice Hall; 1996; 2 pages.

M. Ghaderi, et al.; *Call Admission Control for Voice/Data Integration in Broadband Wireless Networks*; School of Computer Science, University of Waterloo, Tech. Rep. CS-2003-41; pp. 1-24; Nov. 2003.

R. Guerin, et al.; *Equivalent Capacity and Its Application to Bandwidth Allocation in High-Speed Networks*; IEEE J. Select Areas Commun., vol. 9, No. 7, pp. 968-981; 1991.

A Papoulis; *Probability, Random Variables, and Stochastic Processes*; McGraw-Hill;1965; 3 pages.

D.Y. Eun, et al.; *A Measurement-Analytic Approach for QoS Estimation in a Network Based on the Dominant Time Scale*; IEEE/ACM Trans. Networking, vol. 11, No. 2, pp. 222-235; Apr. 2003.

W.E. Leland, et al.; *On The Self-Similar Nature of Ethernet Traffic (Extended Version)*; IEEE/ACM Trans. On Networking., vol. 2, No. 1, pp. 1-15; Feb. 1994.

J. Beran, et al.; *Long-Range Dependence in Variable-Bit-Rate Video Traffic*; IEEE Trans. Commun., vol. 43, No. 2, pp. 1566-1579; Feb. 1995.

W.H. Press, et al.; *Numerical Recipes in C: The Art of Scientific Computing*; Cambridge University Press; 1992; 2 pages.

P.T. Brady; *A Model for Generating On-Off Speech Patterns in Two Way Conversations*; Bell System Tech. J., vol. 48, pp. 2445-2472; Sep. 1969.

J.N. Daigle, et al.; *Models for Analysis of Packet Voice Communications Systems*; IEEE J. Select. Areas Commun., vol. 4, No. 6, pp. 847-855; Sep. 1986.

C. Jedrzycki, et al.; *Probability Distribution of Channel Holding Time in Cellular Telephony Systems*; Proc. IEEE VTC '96, vol. 1; Atlanta, GA; pp. 247-251; May 1996.

\* cited by examiner

CALL ADMISSION CONTROL FOR A WIRELESS NETWORK

CROSS REFERENCE TO RELATED APPLICATIONS

This application claims the benefit of U.S. provisional Application No. 60/585,252, filed on Jul. 2, 2004, entitled "Admission Control for Call and Packet QoS Guarantee in 3G and beyond cellular networks", by Ghaderi, et al.

FIELD OF THE INVENTION

This invention relates in general to the field of wireless communication networks and more particularly to call admission control in wireless communication networks.

BACKGROUND

Call admission control (CAC) is a key element for providing quality of service (QoS) in wireless communication networks. Traditional call admission control techniques typically only address call level QoS because of the underlying circuit based network architecture. In contrast, emerging wireless technologies such as third generation (3G) and fourth generation (4G) wireless networks tend to be packet-switched rather than circuit-switched because the packet-based architecture provides for better sharing of scarce wireless resources.

CAC using a guard channel (GC) scheme is currently used in circuit-switched wireless cellular networks supporting voice calls. The GC scheme works well in minimizing blocked and dropped calls in circuit-switched networks. Other call admission control schemes have also been proposed over the years which have looked at call dropping and call blocking probabilities as the QoS parameters considered, but these schemes have failed to address the unique requirements of a wireless packet-switched network. As such, a need exists in the art for a CAC technique which can take into account some of the unique requirements found in packet-switched wireless networks.

SUMMARY OF INVENTION

A call admission method and apparatus are disclosed which maximizes the wireless channel utilization subject to a predetermined bound on the call dropping and packet loss probabilities for variable-bit-rate traffic in a packet switched network.

In accordance with a first aspect of the invention, a method for providing new call admission control in a communication site, includes accepting a new call in instances where an acceptance ratio exceeds one of an average packet loss probability or a target loss probability for a prescribed time interval.

In another aspect of the invention, a communication controller includes a traffic discriminator operable to control whether a new call session is to be established, said new call session being admitted in instances where an acceptance ratio exceeds one of an average packet loss probability or a target loss probability for a prescribed time interval.

In still another aspect of the invention, a method for determining an acceptance ratio for a communication site that is used in making a call admission control decision, includes collecting information the communication site receives from adjacent communication sites and information available locally to the communication site to determine a time-dependent mean and a time-dependent variance of the number of calls handled by the communication site. The mean and variance of the number of calls are used to find the mean and variance of packet arrivals at the communication site in order to approximate a time-dependent packet arrival.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention may best be understood by reference to the following description, taken in conjunction with the accompanying drawings in which.

DETAILED DESCRIPTION OF THE EMBODIMENT(S)

Figure 1:
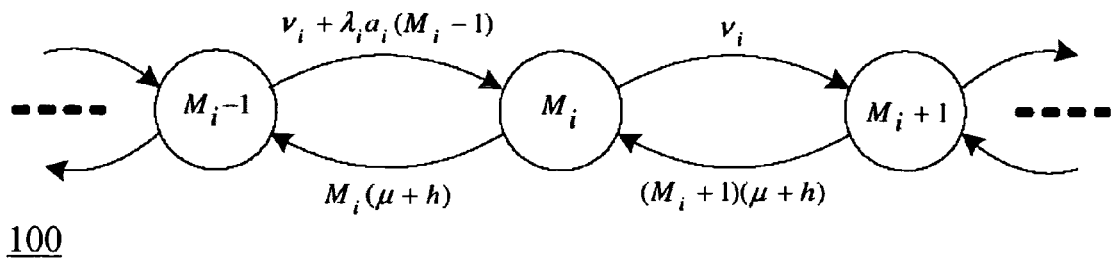
FIG. 1 shows a transition diagram of a call admission control mechanism in accordance with one embodiment of the invention.

While the specification concludes with claims defining the features of the invention that are regarded as novel, it is believed that the invention will be better understood from a consideration of the following description in conjunction with the drawing figures.

In wireless packet networks there exist two levels of quality of service, namely, call-level and packet-level. At the call level, two important parameters which determine the QoS are call blocking probability and call dropping probability. Since dropping a call in progress has greater negative impact from a network user's perspective, handoff calls are given higher priority than new calls trying to gain access to the wireless network's resources. This preferential treatment of handoffs increases the blocking of new calls and hence degrades the utilization of wireless bandwidth.

At the packet level, packet loss probability, delay and jitter are some of the most important QoS parameters. There is always a tradeoff between the network utilization and the QoS perceived by users. The present invention's call admission control scheme addresses the QoS constraints found in a packet-switched wireless network while maximizing the utilization of the network resources.

In accordance with an embodiment of the invention, a packetized fractional guard channel call admission control (PFG CAC) technique for wireless packet networks such as cellular packet networks (although other wireless networks, such as wireless LANs, can also take advantage of the PFG CAC) is disclosed that achieves high bandwidth utilization while satisfying a target packet loss probability without dropping any ongoing calls. A goal of the PFG CAC is to maximize the bandwidth utilization for a given cell capacity, while achieving a zero (or close to zero) percent call drop probability subject to a hard constraint on the packet loss probability. The PFG CAC can be used with voice calls and data sessions, the difference between the two types having no impact on the PFG CAC. The terms "call" and "session" can be used interchangeably when discussing the PFG CAC. The PFG CAC can be implemented in a fully distributed manner were it resides at each communication site (e.g., base station) of a communication system or in a semi-distributed manner partially residing at the communication site(s) and partially at a central control location, or fully centralized at a central control location.

Some aspects of the PFG CAC include:
1) PFG CAC achieves zero percent call dropping;
2) PFG CAC is dynamic, therefore, adapts to a wide range of system parameters and traffic conditions;
3) PFG CAC is distributed and takes into consideration the information from direct neighboring cells in making admission decisions; and
4) The PFG CAC is stochastic and periodic in order to reduce the overhead associated with distributed control schemes used in some networks.

Below is some of the notation which will be used in the discussion of the PFG CAC of the present invention:
B: total number of cells in the network;
$A_i$: the set of adjacent cells of cell i;
$c_i$: capacity of cell i, which is equal to the packet transmission rate of base station i;
$R_i(t)$: packet arrival rate at time t in cell i;
$L_i(t)$: packet loss probability at time t in cell i;
$N_i(t)$: number of active calls at time t in cell i;
$a_i$: new call acceptance ratio in cell i;
$\lambda_i$: new call arrival rate into cell i;
$1/\mu$: mean call duration;
$1/h$: mean cell residency time;
T: length of the control period;
$P_L$: target packet loss probability;
$r_{ji}$: routing probability from cell $j \in A_i$ to cell i;
$P_{ji}$: handoff probability from cell $j \in A_i$ to cell i;
E[z]: the mean of random variable z;
V[z]: the variance of random variable z; and
$\tilde{z}$: the time-averaged value of random variable z.

The communication system used in accordance with one embodiment of the invention is not required to have uniform loading among the different cells which make up the system. Each cell can experience a different load, e.g. some cells can be over utilized while others are underutilized. Also cells may have different capacity levels which changes from time to time, although in one embodiment, the cell capacity is assumed to be fixed over time. However, the approach can be extended to include cases in which $c_i$, varies over time.

The cell residence time distribution may not be exponential but exponential distributions provide the mean value analysis, which indicates the performance trend of the system. Furthermore, the call admission control algorithm in one embodiment involves a periodic control where the length of the control period is set to much less than the average cell residency time of a call to make the algorithm insensitive to this assumption. Although the analysis that is discussed below is based on exponentially distributed call durations and cell residency times, due to the periodical structure of the control algorithm, the PFG CAC is not very sensitive to the assumption of exponentially distributed cell residency times. This is important since cell residency times are usually not exponential in practice. For call durations, it is very common to assume exponential durations which are inherited from the fixed telephony analysis suggesting that user behavior has not changed (or at least call durations have the same characteristics despite migration from fixed lines to mobile phones).

Maximum Occupancy in a Cell: Letting $M_i$ denote the maximum occupancy, i.e., maximum number of calls, in cell i under the average bandwidth assignment scheme which allocates to each variable-bit-rate (VBR) call a share of bandwidth equal to the call's average bandwidth requirement, and letting m denote the average bandwidth of a call, then:

$$M_i = \frac{c_i}{m}. \quad \text{(Equation 1)}$$

Although this technique achieves high bandwidth utilization, it leads to a high rate of packet loss. If there are more than $M_i$ calls in cell i, then the cell is in an overloaded state. In the overloaded state, probability of packet loss is very high. The PFG CAC in one embodiment of the invention rejects new call requests when a cell is in an overloaded state.

Time-Dependent Handoff Probability: If random variable $t_d$ denotes the call duration and variable $t_r$ denotes the cell residency time of a typical call, these variables can be used to compute useful probabilities that will be used in determining the PFG CAC of the present invention. We also let $P_h(t)$ denote the probability that a call hands off to another cell by time t and remains active until time t, given that it has been active at time zero and $P_s(t)$ denotes the probability that a call remains active in its home cell until time t, given that it has been active at time zero. Then, $$P_h(t) = Pr(t_r \leq t)Pr(t_d > t), \qquad \text{(Equation 2)}$$
$$= (1 - e^{-ht})e^{-\mu t}$$

$$P_s(t) = Pr(t_r > t)Pr(t_d > t). \qquad \text{(Equation 3)}$$
$$= e^{-(\mu+h)t}$$

These equations are valid as far as the memoryless property of call duration and cell residency is satisfied. On average, for any call which arrives at time $t' \in (0,t]$, the average handoff and stay probabilities $\tilde{P}_h$ and $\tilde{P}_s$ are expressed as:

$$\tilde{P}_h(t) = \frac{1}{t}\int_0^t P_h(t-t')dt', \qquad \text{(Equation 4)}$$

$$\tilde{P}_s(t) = \frac{1}{t}\int_0^t P_s(t-t')dt'. \qquad \text{(Equation 5)}$$

It is assumed that during a control period each call experiences at most one handoff. This assumption is justified by setting the length of the control period T reasonably shorter than the average cell residency time. Since cell residency is exponentially distributed, the number of cell crossings (handoff events) that an active call experiences during its lifetime has a Poisson distribution with the mean rate h. Therefore, Th is the expected number of handoffs during an interval of length T for an arbitrary call. By setting T<<1/h the probability of having more than one handoff during the interval of length T is negligible. More specifically for uniform networks were each cell has A neighbors, the control interval is given by:

$$T \approx \frac{\sqrt{2A\delta}}{h}, \qquad \text{(Equation 6)}$$

where $\delta$ is the probability of having more than one handoff (multiple handoff probability).

Finally, if $P_{ji}(t)$ denotes the time-dependent handoff probability that an active call in cell j at time 0 will be in cell i at time t, where $j \in A_i$, and since each call experiences at most one handoff during the control period, it is obtained that:

$$P_{ji}(t) = P_h(t)r_{ji} \qquad \text{(Equation 7)}$$

Similarly, the average handoff probability $\tilde{P}_{ji}(t)$ for a call which arrives at any time $t' \in (0,t]$ is given by:

$$\tilde{P}_{ji}(t) = \tilde{P}_h(t)r_{ji} \qquad \text{(Equation 8)}$$

Call Admission Control Algorithm

The PFG CAC in accordance with one embodiment of the invention comprises two main components. The first component is responsible for retrieving the required information from the neighboring cells and computing the acceptance ratio. Since each call experiences at most one handoff during a control period, the immediate neighbors of cell i, i.e. $A_i$, are the ones that will affect the number of calls, and consequently the packet arrival process in cell i during a control period. Hence, in the PFG CAC, information exchange is limited to direct neighboring cells. Using the computed acceptance ratio, the second component enforces the admission control locally in each cell. The previously discussed probabilities are used to find the maximum acceptance ratio for a given cell i with respect to the pre-specified packet loss probability $P_L$.

As mentioned earlier, to reduce the signaling overhead, the PFG CAC has a periodic structure. All the information exchange and acceptance ratio computations happen only once at the beginning of each control period of length T. Several steps involved in the PFG CAC include:

1) At the beginning of a control period each cell i sends the following information to its adjacent cell(s):
   a) the number of active calls in the cell at the beginning of the control period denoted by $N_i(0)$; and
   b) the number of new calls, $N_i$, which were admitted in the last control period.

2) Each cell i receives $N_j(0)$ and $N_j$ from every adjacent cell $j \in A_i$.

3) Cell i uses the received information and those available locally to compute the acceptance ratio $a_i$ using the technique which will be described further below.

4) The computed acceptance ratio $a_i$ is used to admit call requests into cell i using a local control algorithm that is discussed below.

In the PFG CAC, handoffs are always accepted with probability 1 even when the destination cell is overloaded. In this situation, accepting incoming handoffs may increase the number of dropped packets.

For the sake of mathematical modeling it is assumed that there is no buffer in the system. Packets are served as they arrive, and packets that arrive while there is no idle transmission channel are dropped.

Let $s_i$ denote the state of cell i, where there are s calls active in the cell. Let $a_i(s)$ denote the acceptance ratio where the cell state is $s_i$. FIG. 1 shows a state transition diagram of the PFG CAC in cell i. In FIG. 1, $v_i$ is the handoff arrival rate into cell i, and $M_i$ is the maximum occupancy given by equation 1.

For an accurate control, the call blocking probability in each period is effectively given by complementing the acceptance ratio. Therefore, by averaging acceptance ratios over a number of control periods, the call blocking probability in cell i denoted by $P_{bi}$ is expressed as:

$$p_{bi} = 1 - \tilde{a}_i. \qquad \text{(Equation 9)}$$

Consequently, the average network-wide call blocking probability for the considered network is given by:

$$P_b = \frac{\sum_{j=i}^{\beta} \lambda_i p_{bi}}{\sum_{j=i}^{\beta} \lambda_i}. \qquad \text{(Equation 10)}$$

The pseudo-code for the local admission control in cell i is given by the algorithm shown in Table 1 below. In this algorithm, x, is a call requesting a connection into cell i. The acceptance ratio for the respective control period is $a_i$. Also, rand (0,1) is a uniform random generator function.

TABLE 1

(Local call admission control algorithm in cell i)

if (x is a handoff call) then
   accept call;
else /*x is a new call*/
   if (rand(0,1) <$\alpha_i$) & ($N_i(t) \leq M_i$) then
     accept call;

TABLE 1-continued (Local call admission control algorithm in cell i)

```
        else
            reject call;
        end if
    end if
```

Computing the Acceptance Ratio

Assuming the target loss probability is sufficiently small, the packet loss probability is approximated by the overflow probability in each cell.

The approximated packet loss probability can be interpreted as a tight upper bound on the actual packet loss probability. Therefore, the time-dependent packet loss probability at time t in cell i is given by:

$$L_i(t) = Pr(R_i(t) > c_i), \quad \text{(Equation 11)}$$

where $R_i(t)$ denotes the total (new and handoff) packet arrival rate into cell i at time t.

The proposed approach in accordance with an embodiment of the invention for computing the acceptance ratio includes:

1) Each cell i uses the information received from its adjacent cells and information available locally to find the time-dependent mean and variance of the number of calls in the cell using equations 22 and 25, respectively, which are discussed below.

2) The computed mean and variance of the number of calls is used to find the mean and variance of the packet arrival process in the cell using equations 16 and 17, respectively, which are discussed below.

3) Having the mean and variance of the packet arrival process, the time-dependent packet arrival process is approximated by for example using a Gaussian distribution.

4) The tail of the Gaussian distribution is used to find the time-dependent packet loss probability in each cell i.

5) Time-dependent packet loss probability is averaged over a control interval of length T to find an average packet loss probability as expressed in equation 31 below.

6) Using the computed packet loss probability and the prescribed QoS constraint, i.e., $L_i < P_L$, acceptance ratio $a_i$ is computed using equation 32 below. The derivation of the packet loss probability which is used to find the acceptance ratio is discussed and broken down into three main subsections, traffic characterization, mobility characterization and packet loss probability which are discussed below.

A. Traffic Characterization: Let $r_n$ denote the packet generating process of an individual call n. It is assumed that individual packet generating processes are independent and identically distributed random variables with the mean and variance $E[r]$ and $V[r]$, respectively. Then, $R_i(t)$, the total packet arrival rate in cell i at time t, is expressed as the summation of packet generating process of individual calls. That is $$R_i(t) = \sum_{n=1}^{N_i(t)} r_n, \quad \text{(Equation 12)}$$

where $N_i(t)$ denotes the number of calls at time t. The objective is to apply the central limit theorem to approximate $R_i(t)$ by a Gaussian distribution. The parameters $R_i(t)$ especially the mean and variance have to be specified.

If $\Phi_r$ denotes the moment generating function of $r_n$, and if $\Phi_R$ denotes the moment generating function of $R_i(t)$, then $\Phi_R(\theta)$ can be found as follows:

$$\Phi_R(\theta)_{N_i(t)=N} = \quad \text{(Equation 13)}$$
$$E[e^{\theta R_i(t)} \mid N_i(t) = N] = E\left[e^{\theta \sum_{n=1}^{N_i(t)} r_n} \mid N_i(t) = N\right] =$$
$$E\left[e^{\theta \sum_{n=1}^{N_i(t)} r_n}\right] = \{\Phi_r(\theta)\}^N,$$

therefore, $$E[e^{\theta R_i(t)} \mid N_i(t)] = \{\Phi_r(\theta)\}^{N_i(t)} \quad \text{(Equation 14)}$$

and $$E[e^{\theta R_i(t)}] = E[\{\Phi_r(\theta)\}^{N_i(t)}]. \quad \text{(Equation 15)}$$

Using the above equations it is obtained that:

$$E[R_i(t)] = E[N_i(t)]E[r], \quad \text{(Equation 16)}$$

$$V[R_i(t)] = E[N_i(t)]V[r] + V[N_i(t)]E^2[r]. \quad \text{(Equation 17)}$$

As expected, the variance of the total packet arrival rate is a function of both the variance of the individual call packet generating process and the variance of the number of calls at time t. This indicates that static treatment of the number of calls in a cell, i.e., assuming that there are $E[Ni(t)]$ calls in a cell, is not accurate and should be avoided.

In order to compute $E[R_i(t)]$ and $V[R_i(t)]$ the values for $E[r]$ and $V[r]$ have to be determined. In this embodiment it is assumed that $E[r]$ and $V[r]$ are known to the admission controller a priori. This is a minimal set of requirements since it does not assume anything specific about the actual packet generating process of the individual calls. In an actual system two things can happen:

1) The traffic generation process of individual calls can be described by means of an analytical model. In this specific case, $E[r]$ and $V[r]$ are computed using probabilistic techniques.

2) The traffic generation process of individual calls can not be described by means of an analytical model. In this case, $E[r]$ and $V[r]$ are estimated from real traffic measurements.

B. Mobility Characterization: The values for $E[Ni(t)]$ and $V[N_i(t)]$ are calculated based on the mobility information available at the local cell and the information obtained from neighboring cells. The number of calls in cell i at time t is affected by two factors: (1) the number of background (existing) calls which are already in cell i or its adjacent cells, and, (2) the number of new calls which will arrive in cell i and its adjacent cells during the period $(0, t]$ $(0 \leq t \leq T)$. Let $g_i(t)$ and $n_i(t)$ denote the number of background and new calls in cell i at time t, respectively.

A background call in cell i will remain in cell with probability $P_s(t)$ or will handoff to an adjacent cell j with probability $P_{ij}(t)$. A new call which is admitted in cell i at time $t' \in (0, t]$ will stay in cell i with probability $\tilde{P}_s(t)$ or will handoff to an adjacent cell j with probability $\tilde{P}_{ij}(t)$. Therefore, the number of background calls which remain in cell i during the interval $(0, t]$ are binomially distributed. For a binomial distribution with parameter q, the variance is given by $q(1-q)$. Using this property it is obtained that:

$$V_s(t) = P_s(t)(1 - P_s(t)), \quad \text{(Equation 18)}$$

$$V_{ji}(t) = P_{ji}(t)(1 - P_{ji}(t)), \quad \text{(Equation 19)}$$

$$\tilde{V}_s(t) = \tilde{P}_s(t)(1 - \tilde{P}_{ji}(t)) \qquad \text{(Equation 20)}$$

$$\tilde{V}_{ji}(t) = \tilde{P}_{ji}(t)(1 - \tilde{P}_{ji}(t)), \qquad \text{(Equation 21)}$$

where $V_s(t)$ and $V_{ji}(t)$ denote the time-dependent variance of stay and handoff processes, and $\tilde{V}_s(t)$ and $\hat{V}_{ji}(t)$ are their average counterparts, respectively.

The number of calls in cell i is the summation of the number of background calls, $g_i(t)$, and new calls $n_i(t)$. Therefore, the mean number of active calls in cell i at time t is given by:

$$E[N_i(t)] = E[g_i(t)] + E[n_i(t)], \qquad \text{(Equation 22)}$$

where, $$E[g_i(t)] = N_i(0)P_s(t) + \sum_{j \in A_i} N_j(0)P_{ji}(t), \qquad \text{(Equation 23)}$$

$$E[n_i(t)] = (a_i \lambda_i t)\tilde{P}_s(t) + \sum_{j \in A_i} (a_i \lambda_i t)\tilde{P}_{ji}(t). \qquad \text{(Equation 24)}$$

Similarly the variance is given by:

$$V[N_i(t)] = V[g_i(t)] + V[n_i(t)], \qquad \text{(Equation 25)}$$

where, $$V[g_i(t)] = N_i(0)V_s(t) + \sum_{j \in A_i} N_j(0)V_{ji}(t), \qquad \text{(Equation 26)}$$

$$V[n_i(t)] = (a_i \lambda_i t)\tilde{V}_s(t) + \sum_{j \in A_i} (a_j \lambda_j t)\tilde{V}_{ji}(t). \qquad \text{(Equation 27)}$$

Given the arrival rate $\lambda_i$ and the acceptance ratio $a_i$, the actual new arrival rate into cell i is given by $\lambda_i a_i$. Therefore, the expected number of call arrivals during the interval (0,t] is given by $a_i \lambda_i t$.

C. Packet Loss Probability: The packet arrival distribution in each cell can be approximated by a Gaussian distribution:

$$R_i(t) \sim G(E[R_i(t)], V[R_i(t)]) \qquad \text{(Equation 28)}$$

where $E[R_i(t)]$ and $V[R_i(t)]$ are calculated using equations 16 and 17, respectively.

The original admission control problem is reduced to maintaining the packet arrival rate below the available capacity $c_i$ with probability $1-P_L$ at any point in time $t \in (0, T]$. Using equations 11 and 28 it is obtained that:

$$L_i(t) = \frac{1}{2} \operatorname{erfc}\left(\frac{c_i - E[R_i(t)]}{\sqrt{2V[R_i(t)]}}\right), \qquad \text{(Equation 29)}$$

where erfc(c) is the complementary error function defined as $$\operatorname{erfc}(c) = \frac{2}{\sqrt{\pi}} \int_c^\infty e^{-t^2} dt. \qquad \text{(Equation 30)}$$

Using equation 29, the average packet loss probability over a control period of length T is given by:

$$\tilde{L}_i = \frac{1}{T} \int_0^T L_i(t) dt. \qquad \text{(Equation 31)}$$

Then, the acceptance ratio, $a_i$, can be found by numerically solving:

$$\tilde{L}_i = P_L \qquad \text{(Equation 32)}$$

The boundary condition is that $a_i \in [0,1]$, hence if $\tilde{L}_i$ is less than $P_L$ even for $a_i = 1$, then $a_i$ is set to 1. Similarly, if $\tilde{L}_i$ is greater than $P_L$ even for $a_i = 0$, then $a_i$ is set to 0.

D. Actual New Arrival Rate: The actual new arrival rate into a cell j is denoted by $\bar{\lambda}_j$, as follows:

$$\bar{\lambda}_j = a_j \lambda_j. \qquad \text{(Equation 33)}$$

In order to compute $a_i$ for the new control period it is required to know the value of $\bar{\lambda}_j$ for every adjacent cell. Similarly, cell j needs to know $\bar{\lambda}_i$ in order to be able to compute $a_j$. Therefore, every cell depends on its adjacent cells and vice versa. To break this dependency, instead of using the actual value of each cell i estimates the actual new call arrival rates of its adjacent cells for the new control period.

Let $\bar{\lambda}_j(n)$ denote the actual new call arrival rate into cell j during the n-th control period. Also, let $N_j(n)$ denote the number of new calls that were accepted in cell j during the n-th control period. An estimator for $\bar{\lambda}_j$ is expressed as $$\bar{\lambda}_j(n+1) = (1 - \epsilon)\frac{N_j(n)}{T} + \epsilon \bar{\lambda}_j(n), \qquad \text{(Equation 34)}$$

where, $\bar{\lambda}_j(n+1)$ is the actual new call arrival rate into cell j at the beginning of the (n+1)-th control period. Note that $\bar{\lambda}_j(n)$ is known at the beginning of the (n+1)-th control period. In simulations that were performed, it was found that $\epsilon = 0.3$ leads to a good estimation of the actual new call arrival rate.

Simulation Results

A. Simulation Parameters: Simulations were performed on a two dimensional cellular system comprising 19 hexagonal cells like that shown in FIG. 2. In the simulation, opposite sides of the system were wrapped around to eliminate finite size effects. As the basic traffic type, packetized voice calls were generated for simulation purposes. For packetized voice, a packet loss probability of $P_L = 0.01$ is acceptable.

Figure 2:
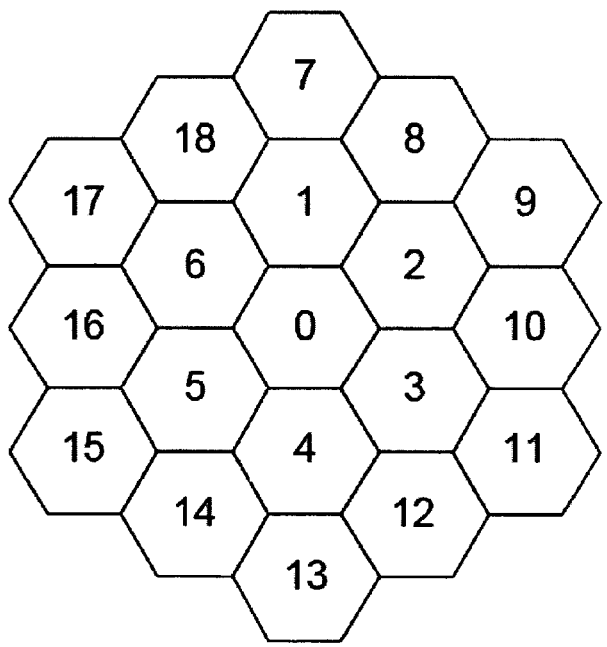
FIG. 2 shows a diagram of a cellular system in accordance with one embodiment of the invention.
Figure 3:
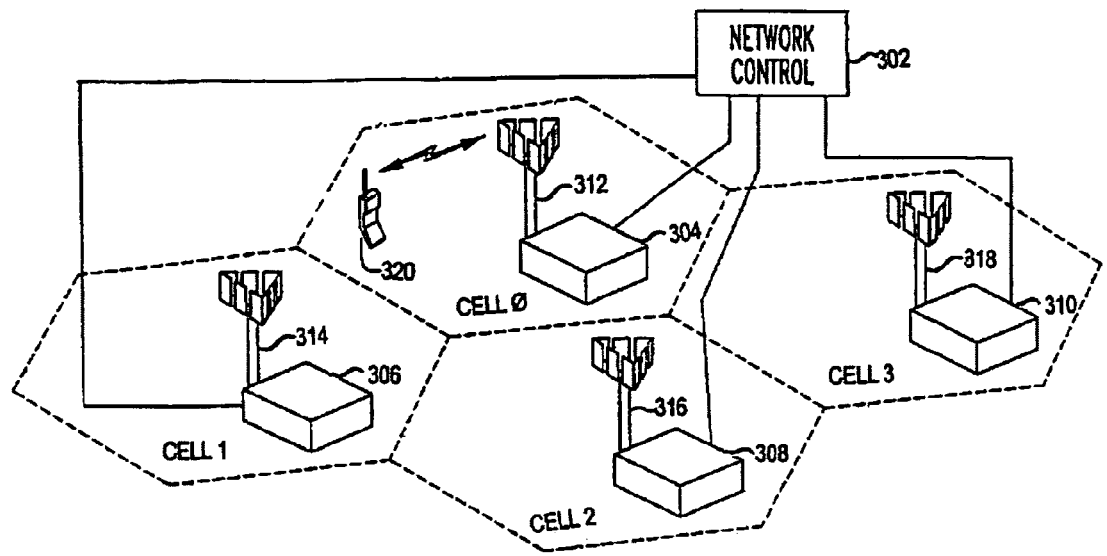
FIG. 3 shows a more detail view of some of the cells in the system of FIG. 2.

In FIG. 2, cell 0 is shown having six adjacent cells which are cells 1-6. In accordance with an embodiment of the invention, each cell in a communication network receives information from its adjacent cells as previously discussed. In FIG. 3, a more detailed view of cell 0 and a few of its adjacent cells (cells 1-3) are shown. Each cell includes one or more antenna sites, antenna sites 312-318, that provide the necessary radio frequency coverage over their individual cell areas. Coupled to the one or more antenna site 312-318 in each cell site is a base station 304-310. Each of the base stations 304-310 provides the necessary radio frequency (RF) receive and transmit control capabilities each cell site requires, as well as the necessary communication control functions needed to direct messages. In accordance with an embodiment of the invention, the PFG CAC is performed by each of the base stations 304-310 in order to provide for improved call admission control throughout the communication network 300. It should be noted that the technique of the invention does not require a central control function. The technique would also work with a distributed control function (the details of this distributed control function are not part of this invention and thus not discussed in this application).

Also shown in FIG. 3 is a network control 302 which provides the overall control for the communication network 300. Depending on the particular system design, network control 302 can provide multiple functions including such things as providing interconnection between the communication network 300 and the public switched telephone network (PSTN) and/or the Internet, provide coordination of communications between the plurality of base sites 304-310, etc.

Figure 4:
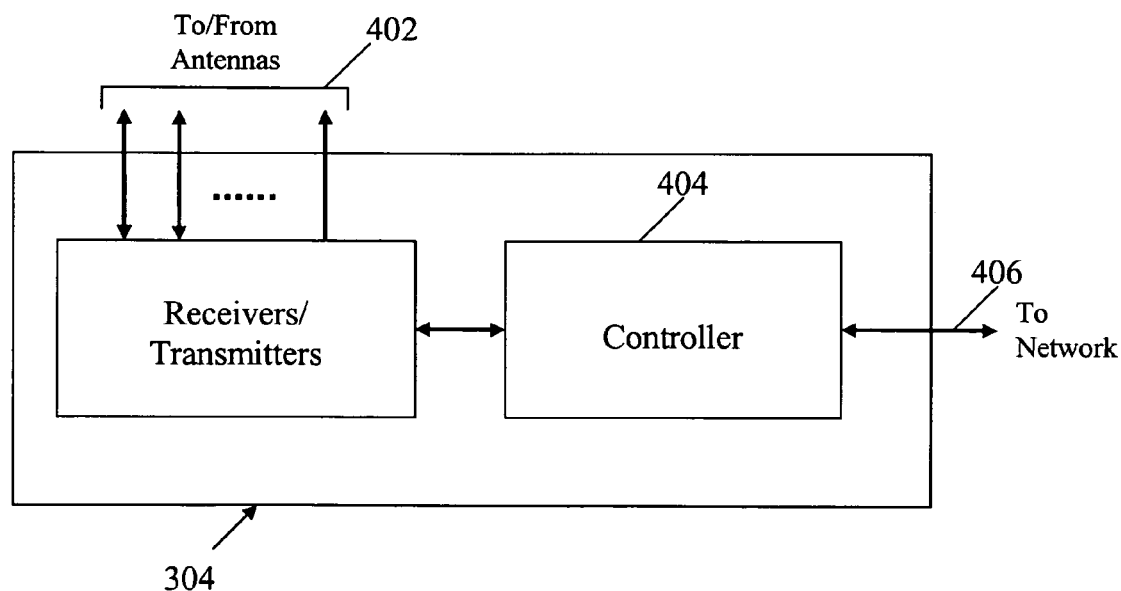
FIG. 4 shows a detailed block diagram of a cell site in accordance with one embodiment of the invention.

Referring now to FIG. 4, there is shown a block diagram of cell site 0's base station 304. Base station 304, includes a plurality of input/output ports 402 for receiving/transmitting communication signals to/from the antenna site 312. A controller 404 controls the operation of the base station. The base station includes whatever hardware and software required to implement the invention depending on the particular system design. A controller port 406 couples base station 304 to the rest of the communication network 300. Via port 406, the required information from adjacent base stations is received and local information is sent out to the other base stations in accordance with the embodiments of the invention that are discussed herein. In accordance with an embodiment of the invention, the controller 404 provides a traffic discriminator operable to control whether a new call session is to be established, said new call session being admitted in instances where an acceptance ratio exceeds one of an average packet loss probability or a target loss probability for a prescribed time interval.

The common parameters used in the simulation were as follows: all the cells have the same capacity c; target packet loss probability was set to $P_L=0.01$; control interval was set to T=20 seconds; and all the neighboring cells have the same chance to be chosen by a call for handoff, i.e. $r_{ji}=\frac{1}{6}$. For ease of illustrating the results, it was assumed that the communication system is uniform and the input load is the same for every cell, although PFG CAC is designed to handle the non-uniform case. The simulation can also accommodate arbitrary load distributions. In all of the cases simulated, normalized load is used to show a fair comparison of performance measures irrespective of the absolute values of cell capacity and arrival rates, where the normalized load is defined as:

$$\rho = \frac{1}{M_i}\left(\frac{\lambda}{\mu}\right),$$ (Equation 35)

where $M_i$ is given by equation 1.

For each load, simulations were done by averaging over 8 samples, each for $10^4$ seconds of simulation time. Call duration and cell residency times were exponentially distributed with means $\mu^{-1}=180$ s and $h^{-1}=100$ seconds, respectively (except for the last simulated case).

Figure 5:
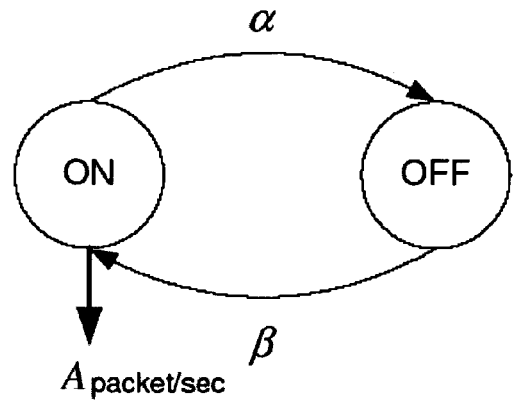
FIG. 5 shows a two state Markov model representing packetized voice traffic.

B. Traffic Model: The two state Markov model shown in FIG. 5 is used to describe the traffic generation process of voice calls. This simple process can model voice and video traffic sources as well as other complicated traffic scenarios. In this model, $\alpha$ and $\beta$ are transition rates to OFF and ON states, respectively, from ON and OFF states. While in the ON state, traffic is generated at a constant rate of A packet/sec. The activity factor of such a traffic source is defined to be the probability of being in the ON state and is given by:

$$\eta = \frac{\beta}{\alpha + \beta}.$$ (Equation 36)

For this traffic model, the mean and variance of the traffic generated is given by $E[r]=\eta A$ and $V[r]=\eta(1-\eta)A^2$. Commonly used parameters for human speech representation are $\alpha^{-1}=1.2$ s and $\beta^{-1}=1.8$ s. Using an 8 Kbps (Kilo-bits-per-second) encoded voice source, it is obtained that A=100 packet/sec and hence, $E[r]=40$ packet/sec and $V[r]=50$ packet/sec assuming that each packet is 80 bits long.

C. Conservative PFG: In an embodiment described previously, PFG CAC does not drop any handoff calls, instead some packets may be dropped to accommodate the incoming handoff packets. To determine the impact of accepting handoffs even during the overloaded state, an alternative embodiment of PFG CAC has also been developed.

This alternate embodiment of the PFG CAC drops handoffs during the overloaded state. The original PFG CAC is referred to as PFG-DO and the alternate embodiment as PFG-DP where DO and DP stand for zero dropping probability and P dropping probability, respectively, i.e. if we use PFG-DP instead of PFG-DO then there will be P percent call dropping. The goal is to determine the value of P for some simulated scenarios to see how far it is from zero. Having $N_i(t)>M_i(t\epsilon(0,T])$ indicates that cell i is in the overloaded state at time t. The pseudo-code for PFG-DP in cell i is shown in Table 2 below.

TABLE 2

Pseudo-code of PFG-DP algorithm in cell i

```
if (x is a handoff call) then
    if (N_i(t) ≦ M_i) then
        accept call;
    else
        reject call;
    end if
else /*x is a new call*/
    if (rand(0,1) <a_i) & (N_i(t) ≦ M_i) then
        accept call;
    else
        reject call;
    end if
end if
```

D. Simulation Results and Analysis: 1) Effect of cell capacity: Intuitively, increasing the cell capacity leads to a better Gaussian approximation, and a potentially better call admission decision given that the accuracy of the achieved results in terms of blocking and loss are increased. To investigate the effect of cell capacity, three different capacity configurations were investigated: a 1 Mbps capacity profile labeled the c1 profile, a 2 Mbps capacity profile labeled the c2 profile and a 5 Mbps profile labeled the c5 profile. Normalized loads in range [0 . . . 2] are simulated, where the normalized load is defined by equation 35.

Figure 6:
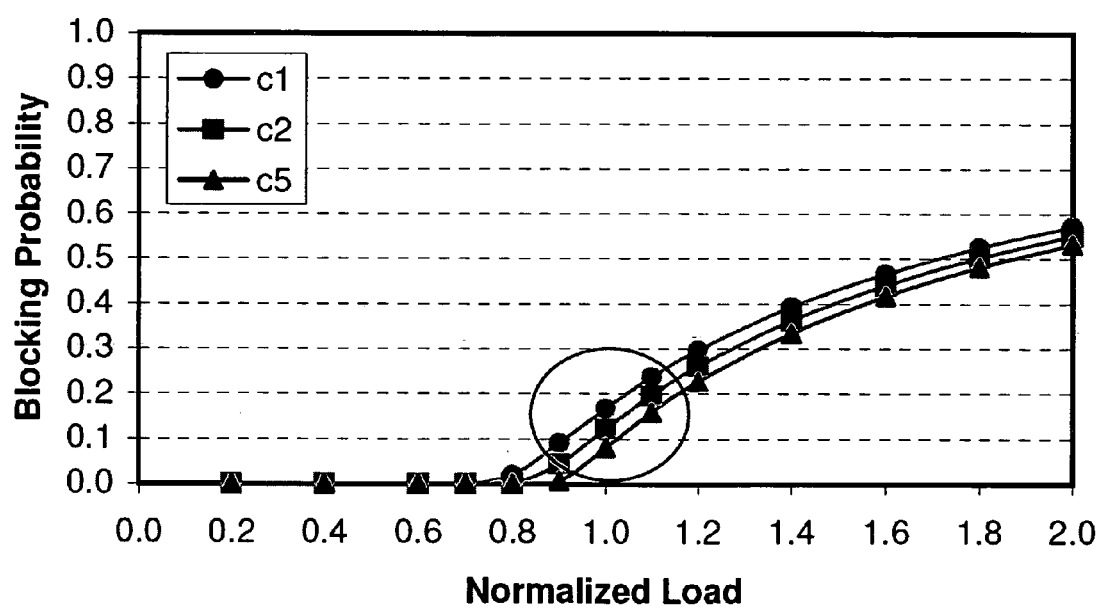
FIG. 6 shows a diagram highlighting blocking probability simulation results in accordance with one embodiment of the invention.
Figure 7:
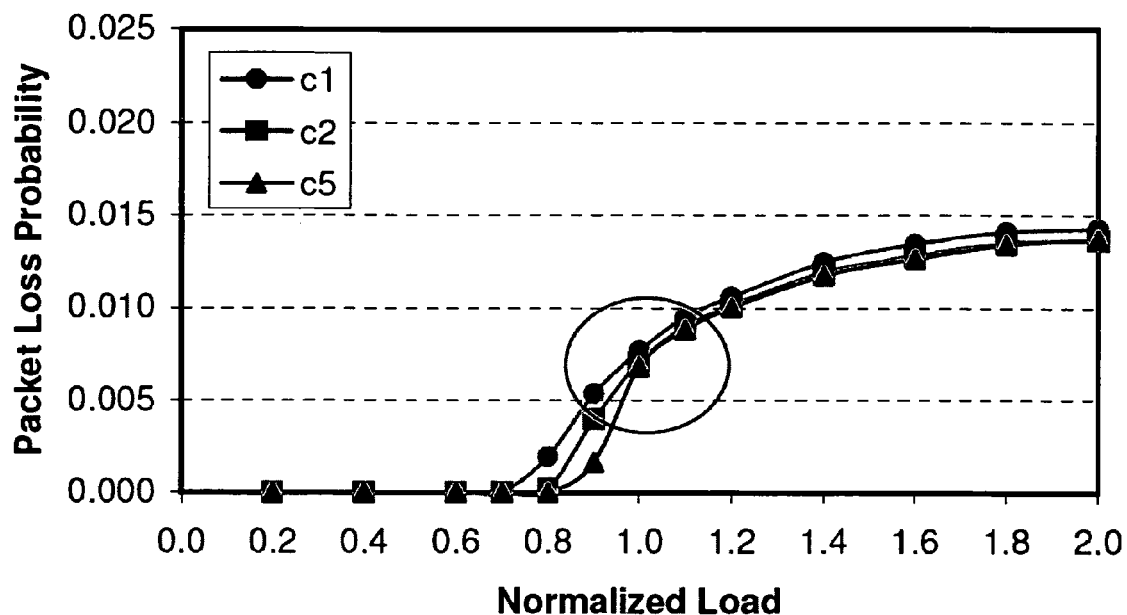
FIG. 7 shows a diagram highlighting packet loss probability simulation results in accordance with one embodiment of the invention
Figure 8:
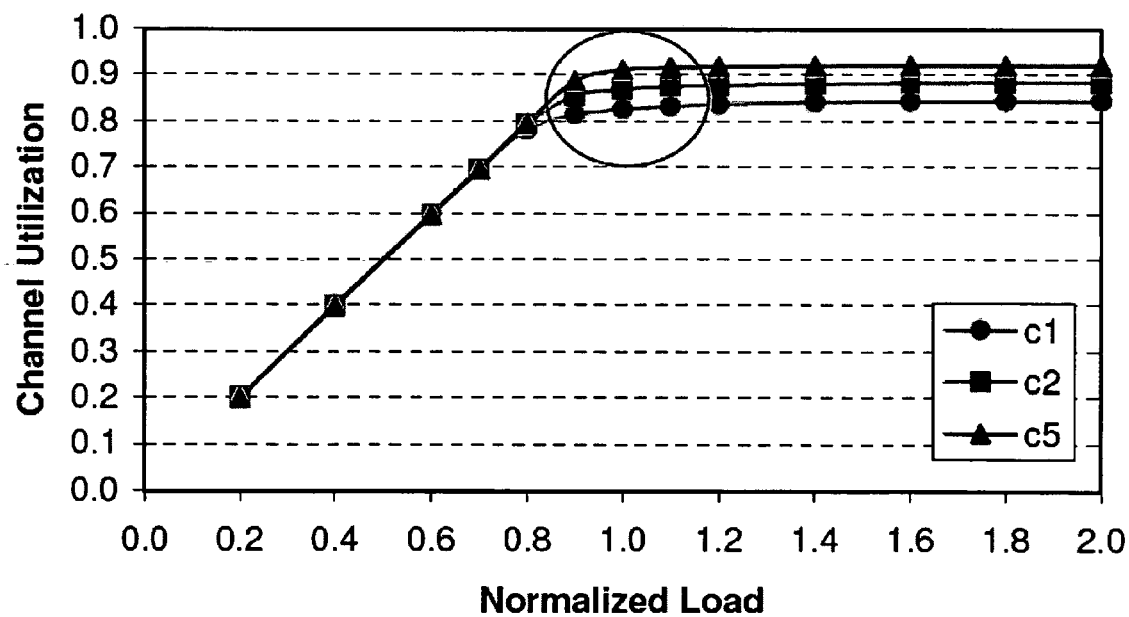
FIG. 8 shows a diagram highlighting channel utilization simulation results in accordance with one embodiment of the invention.

In FIGS. 6-8 a region around load $\eta=1.0$ has been circled since this is the most interesting part of the system which is most likely to happen in practice.

In order to better describe the results these circled region in FIGS. 6-8 are referred to as the operating region of the system.

In FIG. 6, there is shown the new call blocking probability. As shown, as the cell capacity increases, the blocking probability decreases, which can be explained from the central limit theorem and Gaussian approximation previously discussed. As the system capacity increases, the Gaussian modeling leads to a potentially better approximation and hence, a decreased call blocking probability. The packet loss probability, $L_i$, is depicted in FIG. 7. Although $\tilde{L}_i$ goes beyond the target limit for high system loads, it is completely satisfactory for the operating region. Nevertheless, it is quite possible to modify the PFG-DO call admission scheme in order to make it more conservative for high loads. Similar to call blocking, as the capacity increases the PFG-DO efficiency improves.

FIG. 8 shows the wireless bandwidth utilization under the three different system capacities. As explained before, increased accuracy of the Gaussian approximation for high system capacity leads to a better channel utilization. The c1 capacity produces rather accurate results and increasing the capacity beyond it produces only marginal improvements.

2) Effect of accepting handoffs in overloaded state:
To investigate the impact of accepting handoffs during the overloaded state (in which $N_i(t) > M_i$), the PFG-DP scheme was run for the same simulation configuration as were run for the PFG-D0 scheme. Table 3 shows the call dropping probabilities for different loads and capacities.

TABLE 3

PFG-DP call dropping probability

| Load | C1 | C2 | C5 |
|---|---|---|---|
| 0.2 | 0.000000 | 0.000000 | 0.000000 |
| 0.6 | 0.000000 | 0.000000 | 0.000000 |
| 1.0 | 0.000000 | 0.000000 | 0.000000 |
| 1.4 | 0.000007 | 0.000002 | 0.000001 |
| 1.8 | 0.000012 | 0.000006 | 0.000005 |

It is observed that the call dropping probability is almost zero in all the simulated configurations which means that there is no difference between the two call admission schemes (PFG-D0 and PFG-DP) in terms of the call dropping probability.

Figure 9:
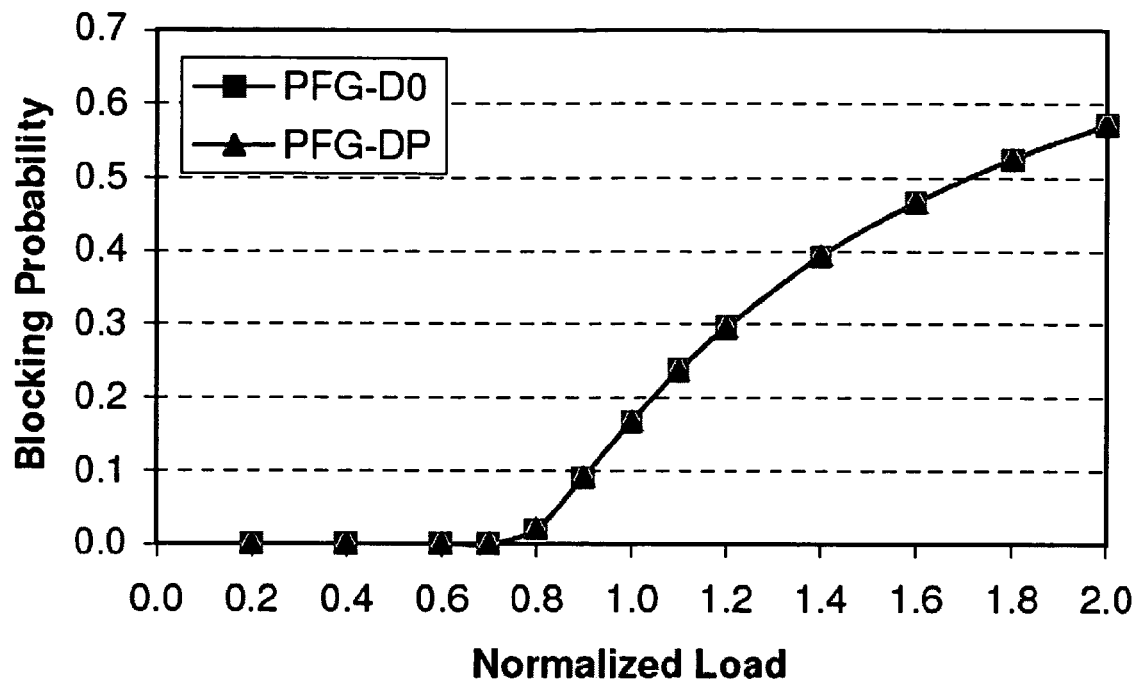
FIG. 9 shows a diagram comparing blocking probability simulation results for two embodiments of the invention.
Figure 10:
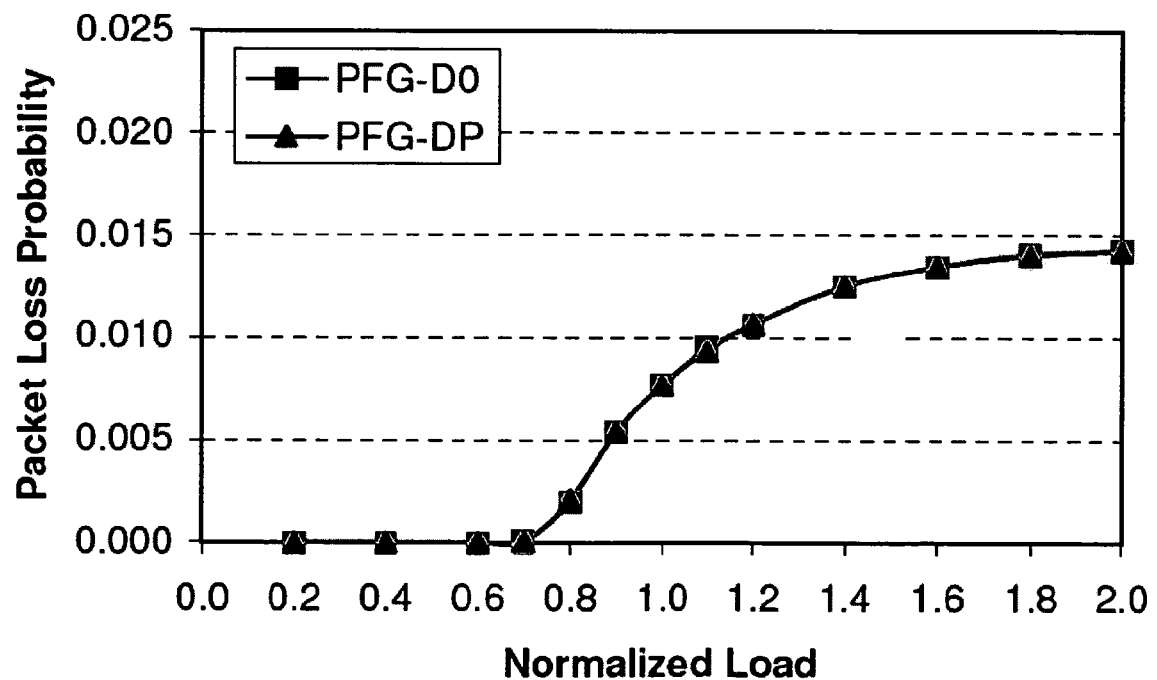
FIG. 10 shows a diagram comparing packet loss probability simulation results for two embodiments of the invention.

FIG. 9 and FIG. 10 show the call blocking and packet loss probabilities of PFG-D0 versus PFG-DP when the system capacity is set to c1 (1 Mbps). Overall, there is no difference between the two schemes. It can be seen from FIG. 10 that the packet loss probability is almost the same for both schemes, indicating that accepting handoffs during the overloaded state has a negligible effect on the call admission control performance. FIG. 9 highlights the minimal difference in blocking probability between the two schemes.

3) Effect of mobility: To increase the capacity of cellular networks, micro/pico cellular architectures will be deployed in the future. The smaller cell size of these architectures leads to a higher handoff rate. If the mobility factor is defined to be $\alpha = h/\mu$, intuitively, $\alpha$ shows the average number of handoff attempts a call makes during its life time. As the mobility factor increases, the handoff arrival rate increases as well. To investigate the impact of mobility on PFG CAC, we have simulated three mobility cases for the base capacity c1 as shown in Table 4 below.

TABLE 4

Mobility Profiles

| Profile | $1/\mu(s)$ | $1/h(s)$ | $\alpha$ |
|---|---|---|---|
| Mobility High | 180 | 20 | 9.00 |
| Mobility Moderate | 180 | 100 | 1.80 |
| Mobility Low | 180 | 500 | 0.36 |

In Table 4, $\alpha = 9.00$ represents a highly mobile scenario such as vehicular users in a high way; $\alpha = 1.80$ represents an urban area mobility scenario, and finally, $\alpha = 0.36$ represents a low mobility scenario.

Figure 11:
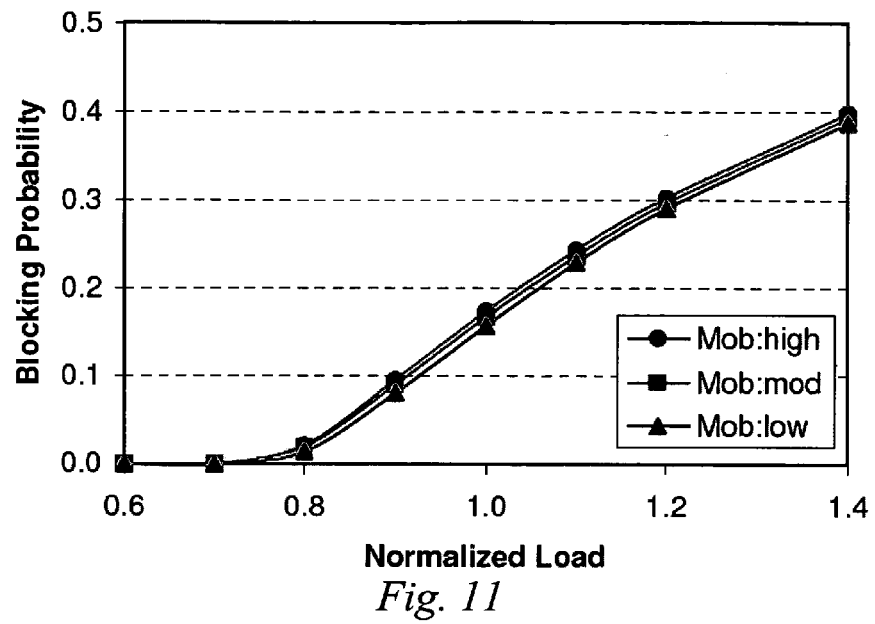
FIG. 11 shows a diagram highlighting blocking probability simulation results at different mobility levels in accordance with one embodiment of the invention.
Figure 12:
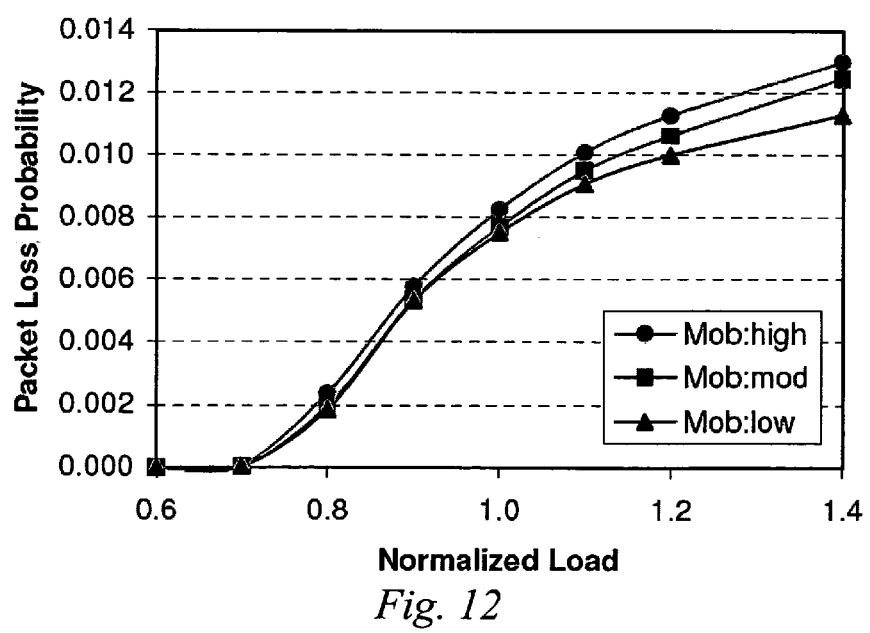
FIG. 12 shows a diagram highlighting packet loss probability simulation results at different mobility levels in accordance with one embodiment of the invention.
Figure 13:
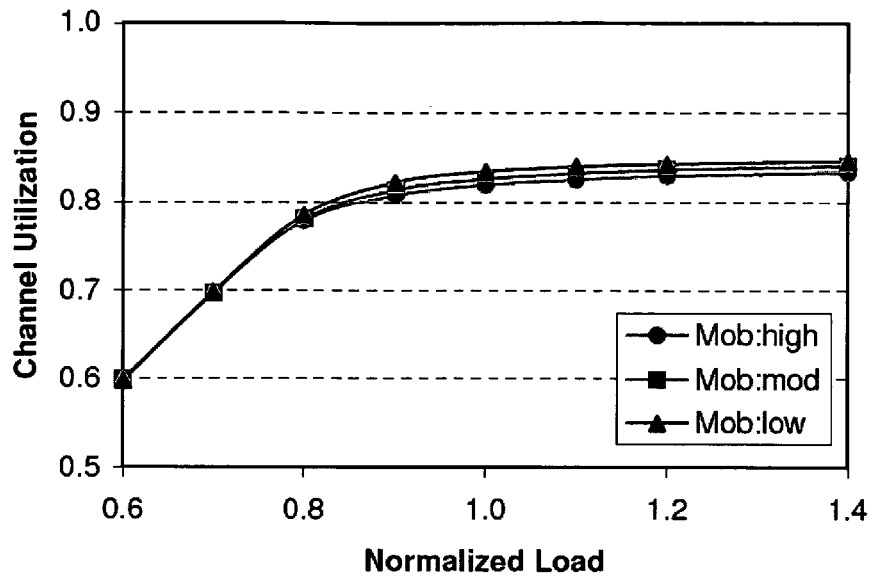
FIG. 13 shows a diagram highlighting channel utilization simulation results at different mobility levels in accordance with one embodiment of the invention.

Observed from FIGS. 11-13, PFG CAC is almost insensitive to the mobility rate of users. As shown in FIGS. 11 and 13, the call blocking probability (shown in FIG. 11) and channel utilization (shown in FIG. 13) almost match. Furthermore, FIG. 12 shows that the effect of mobility on packet loss probability is not very significant. In all three cases, PFG CAC is able to satisfy the target packet loss probability in the operating region of the system. In general, handoff degrades the performance of cellular systems.

4) Effect of Control Interval: Both signaling overhead and accuracy of PFG CAC are affected by the control interval. Although increasing the control interval reduces the signaling overhead, the admission control accuracy will deteriorate. Therefore, there must be a compromise between the incurred overhead and the achieved accuracy. As was previously shown, this compromise depends on the mobility of users.

Figure 14:
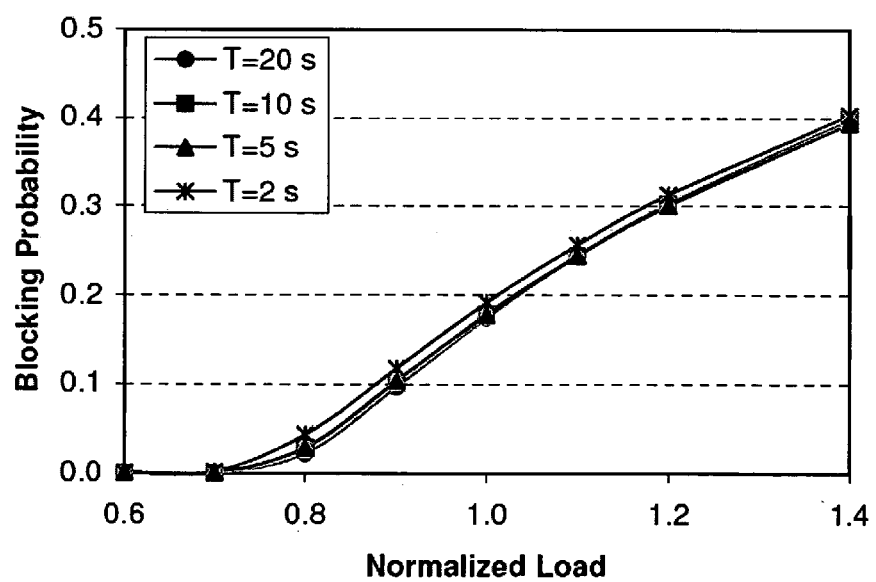
FIG. 14 shows a diagram highlighting blocking probability results using different control intervals in accordance with one embodiment of the invention.
Figure 15:
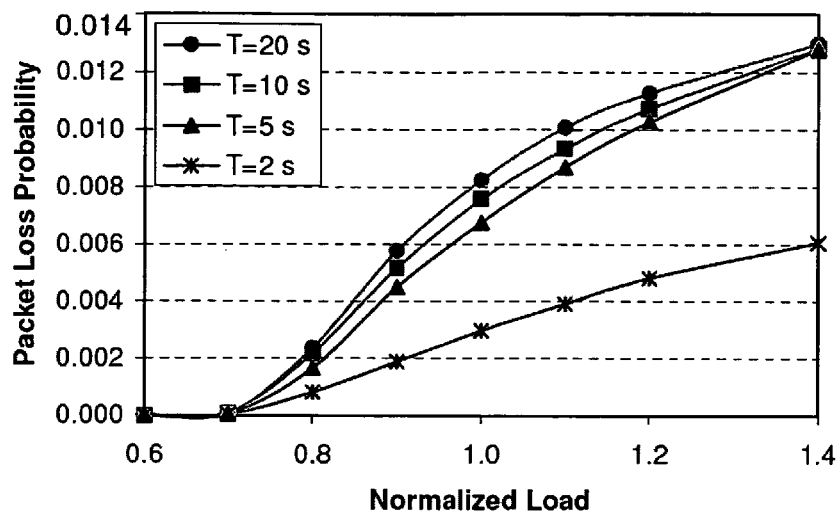
FIG. 15 shows a diagram highlighting packet loss probability results using different control intervals in accordance with an embodiment of the invention.

FIGS. 14 and 15 show the effect of control interval on the performance of PFG CAC. The simulated scenarios consider the high mobility profile in Table 3, where the mobility factor is set to $\alpha = 9$. It is observed that by, reducing the control interval T, the accuracy of PFG CAC in terms of the achieved packet loss probability increases. FIG. 14 shows the results for the blocking probability, while FIG. 15 shows the results for the packet loss probability, for different control intervals. FIGS. 9-10 show that there is a small discrepancy between the two scenarios when the control interval is the same and equal to T=20 s.

Using Equation 6, it is obtained that:

$$\frac{T_{Mob:high}}{T_{Mob:mod}} = \frac{\alpha_{Mob:mod}}{\alpha_{Mob:high}}. \qquad \text{(Equation 37)}$$

Figure 16:
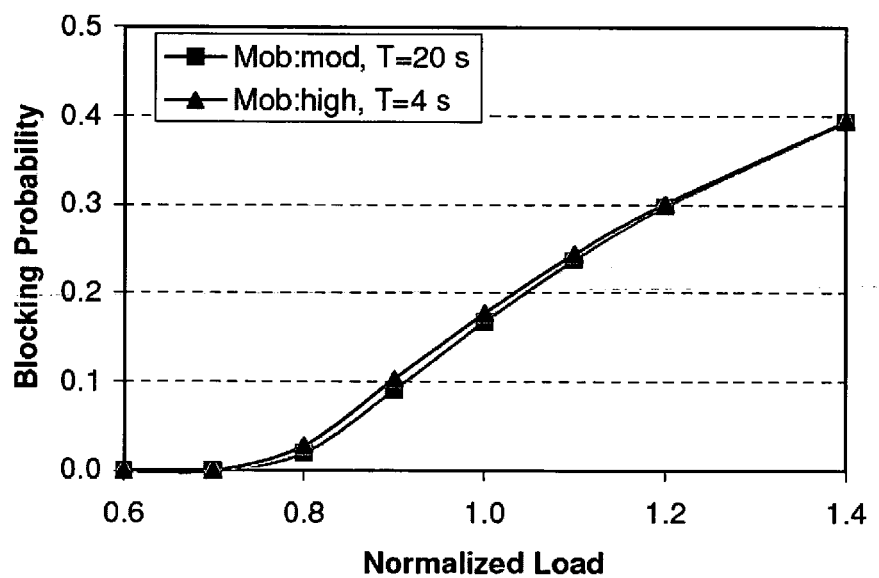
FIG. 16 shows a diagram highlighting blocking probability results using different control intervals for different mobility patterns in accordance with an embodiment of the invention.
Figure 17:
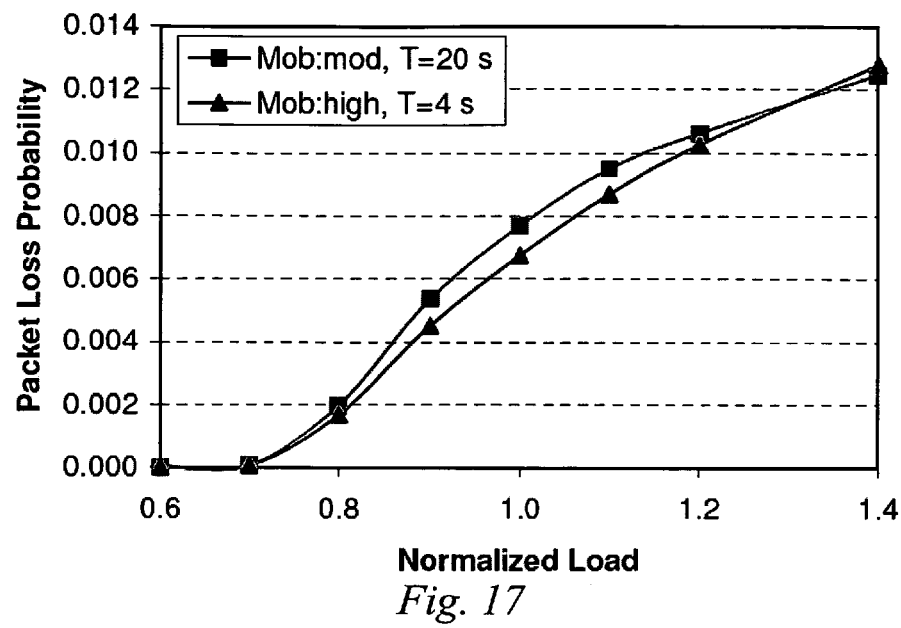
FIG. 17 shows a diagram highlighting packet loss probability results using different control intervals for different mobility patterns in accordance with an embodiment of the invention.

Therefore, $T_{Mob:high}$ must be set to $\frac{1}{5} T_{Mob:mod}$ in order to see the same performance results. FIGS. 16 and 17 show the simulation results for high mobility and moderate mobility scenarios where $T_{Mob:high} = 4s$ and $T_{Mob:mod} = 20s$, FIG. 16 highlights the blocking probability results, while FIG. 17 highlights the packet loss probability.

5) Effect of nonexponential cell residence times: The first part of the analysis, which gives the equations describing the mean and variance of the traffic generation process, is based on the assumption of the exponential cell residency time. As mentioned earlier, exponential distributions provide the mean value analysis, which indicates the performance trend of the system. However, in practice, cell residence times are usually non-exponentially distributed. In this section, we investigate the sensitivity of PFG CAC to exponential cell residency assumption.

Using real measurements, it has been shown in the research literature that a lognormal distribution may be a better model for cell residency time.

Figure 18:
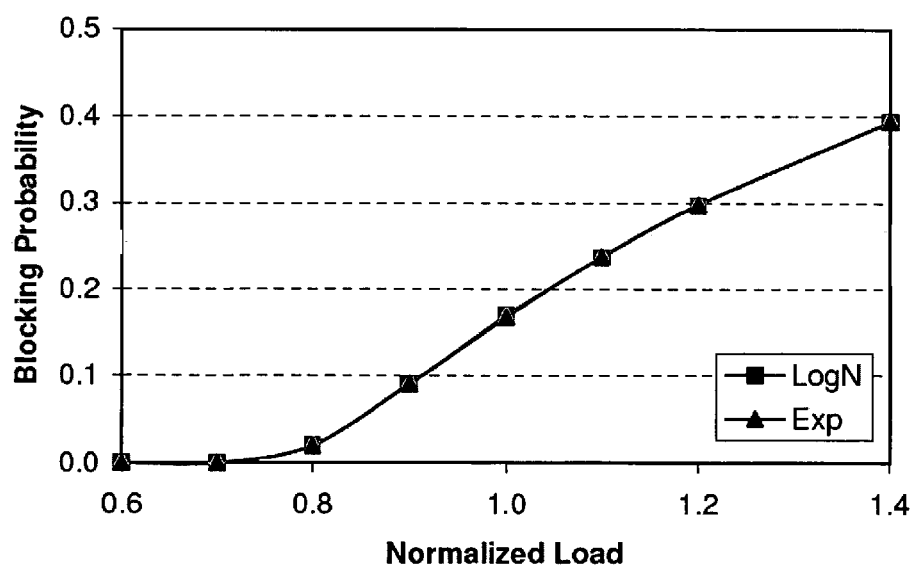
FIG. 18 shows a diagram highlighting blocking probability simulation result using lognormal versus exponential residence times in accordance with an embodiment of the invention.
Figure 19:
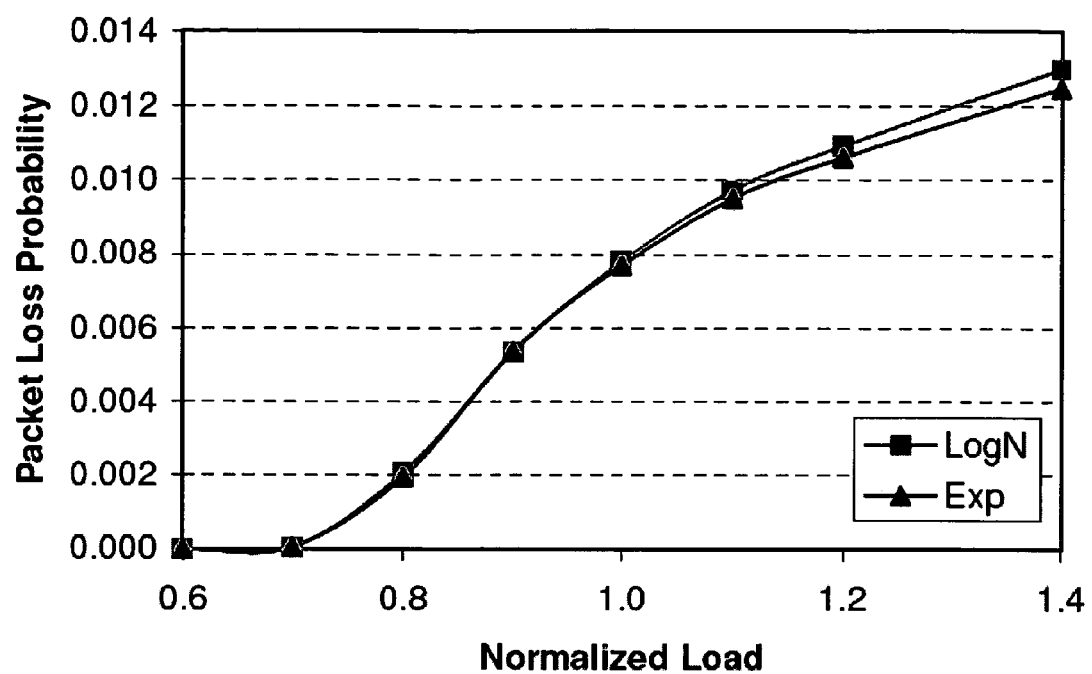
FIG. 19 shows a diagram highlighting packet loss probability simulation result using lognormal versus exponential residence times in accordance with an embodiment of the invention.

Comparing the results obtained under exponential distribution with those obtained under more realistic lognormal distribution it was found that the mean and variance of both distributions are the same. FIG. 18 shows the call blocking and FIG. 19 shows the packet loss probability of exponential cell residency versus lognormal cell residency. It is observed that the exponential cell residency achieves sufficiently accurate control. The control algorithm is rather insensitive to this assumption due to its periodic control in which the length of the control interval is much smaller than the mean residency time.

The present invention can also potentially be extended in order to be used in wireless multimedia networks that have different service classes, each of which has its own packet and call level QoS constraints. By embedding the loss rate into equation 31, the PFG CAC is able to have a more precise control on actual packet loss probability.

In summary, a new call admission control technique and apparatus have been described that provide for improved QoS provisioning for packet-switched networks. The PFG CAC is able to not only improve the utilization of scarce wireless bandwidth, due to the statistical multiplexing of variable-bit-rate traffic sources, but also is able to reduce or eliminate the undesirable call dropping events inherent to circuit-switched cellular systems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

For example, the PFG CAC can be implemented in software and can be located locally in individual-base stations, can reside in base station controllers that handle multiple sites, or in some cases, can be centrally located in for example a network controller or other type of central infrastructure device.

What is claimed is:

1. A method for providing call admission control in a communication site, comprising:
   accepting at a controller a new wireless call in instances where an acceptance ratio exceeds one of an average packet loss probability or a target loss probability for a prescribed time interval, wherein the new call is accepted in instances where a uniform random generator function rand(0,1) is related to an acceptance ratio $a_i$ by the expression rand(0,1)<$a_i$, where $a_i$ is set to 1 if an average packet loss probability over a control period ($\tilde{L}_i$) is less than a target packet loss probability($P_L$) and where $a_i$ is set to 0 if $\tilde{L}_i$ is greater than $P_L$.

2. A method as defined in claim 1, further comprising:
   rejecting the new call if a uniform random generator function rand(0,1)≧acceptance ratio $a_i$.

3. A method as defined in claim 1, further comprising:
   rejecting the new call even if a uniform random generator function rand(0,1)<acceptance ratio $a_i$, if the number of active calls currently being handled by the communication site is greater than a predetermined number of calls.

4. A method as defined in claim 1, further comprising:
   determining $\tilde{L}_i$ by solving the equation $$\tilde{L}_i = \frac{1}{T}\int_0^T L_i(t)\,dt,$$

where $L_i(t)$ is the packet loss probability at time t for the communication site and T is the length of a control period.

5. A method as defined in claim 4, wherein the target loss probability ($P_L$) is a predetermined number that is known by the communication site.

6. A method for providing call admission control in a communication site, comprising:
   accepting a new wireless call in instances where an acceptance ratio exceeds one of an average packet loss probability or a target loss probability for a prescribed time interval, wherein the acceptance ratio ($a_i$) is determined by:
   collecting information at the communication site from adjacent communication sites and information available locally to the communication site to determine a time-dependent mean and a time-dependent variance of the number of calls handled by the communication site;
   using the mean and variance of the number of calls to find the mean and variance of packet arrivals at the communication site;
   approximating a time-dependent packet arrival using a Gaussian distribution;
   using the Gaussian distribution to find a time-dependent loss probability;
   averaging the time-dependent packet loss probability over a control interval to find an average packet loss probability; and
   using the packet loss probability to determine the acceptance ratio.

7. A method as defined in claim 6, further comprising:
   determining if a hand-off call has been received; and
   accepting the hand-off call if the number of active calls being handled by the communication site is equal to or less than the maximum number of calls the communication site can handle.

8. A method as defined in claim 6, further comprising:
   receiving at the communication site from an adjacent communication site the number of active calls being handled by the adjacent communication site at the start of a control period and the number of new calls which were admitted by the adjacent communication site in an immediately preceding control period.

9. A method as defined in claim 8, further comprising:
   transmitting from the communication site to the adjacent communication site the number of active calls being handled by the communication site at the start of the control period and the number of new calls which were admitted by the communication site in the immediately preceding control period.

10. A communications controller for a wireless network, comprising:
    a traffic discriminator operable to control whether a new call session is to be established, said new call session being admitted in instances where an acceptance ratio exceeds one of an average packet loss probability or a target loss probability for a prescribed time interval, wherein the new call session is accepted in instances where a uniform random generator function rand(0,1) is related to an acceptance ratio $a_i$ by the expression rand(0,1)<$a_i$ where $a_i$ is set to 1 if an average packet loss probability over a control period ($\tilde{L}_i$) is less than a target packet loss probability($P_L$), and where $a_i$ is set to 0 if $\tilde{L}_i$ is greater than $P_L$.

11. A communications controller as defined in claim 10, wherein the communications controller is connected to a wireless base station that is part of a packet-switched network.

12. A communications controller as defined in claim 10, wherein the acceptance ratio ($a_i$) is determined by the controller by collecting information from adjacent communication sites that are coupled to the traffic discriminator to determine a time-dependent mean and a time-dependent variance of the number of calls handled by the controller.

13. A communications controller as defined in claim 12, wherein the acceptance ratio ($a_i$) is further determined by the controller by using the mean and variance of the number of calls to find the mean and variance of packet arrivals at a base station.

14. A communications controller as defined in claim 13, wherein the acceptance ratio ($a_i$) is further determined by the controller by approximating a time-dependent packet arrival using a Gaussian distribution, using the Gaussian distribution to find a time-dependent loss probability, averaging the time-dependent packet loss probability over a control interval to find an average packet loss probability and using the average packet loss probability to determine the acceptance ratio.

15. A communications controller as defined in claim 10, wherein the controller rejects the new call request if a uniform random generator function rand(0,1)≧acceptance ratio $a_i$.

16. A communications controller as defined in claim 10, wherein the controller rejects the new call even if a uniform random generator function rand(0,1)<acceptance ratio $a_i$, if the number of active calls currently being handled by the base station is greater than a predetermined number of calls.

17. A communications controller as defined in claim 10, wherein the controller determines $\tilde{L}_i$ by solving the equation $$\tilde{L}_i = \frac{1}{T}\int_0^T L_i(t)dt,$$

where $L_i(t)$ is the packet loss probability at time t for a base station and T is the length of a control period.

18. A method for determining an acceptance ratio for a communication site that is used in making a call admission control decision, comprising:
  collecting information at the communication site from adjacent communication sites and information available locally to the communication site to determine a time-dependent mean and a time-dependent variance of the number of calls handled by the communication site;
  using the mean and variance of the number of calls to find the mean and variance of packet arrivals at the communication site;
  approximating a time-dependent packet arrival;
  using the approximated time-dependent packet arrival to find a time-dependent loss probability;
  averaging the time-dependent packet loss probability over a control interval to find an average packet loss probability; and
  using the packet loss probability to determine the acceptance ratio.

19. A method as defined in claim 18, wherein the time-dependent packet arrival is approximated using a Gaussian distribution.

20. A method as defined in claim 18, wherein the method for determining the acceptance ratio for the communication site is performed entirely or partially at the communication site.

21. A method as defined in claim 18, wherein the method for determining the acceptance ratio for the communication site is performed at a central controller that is coupled to the communication site.

* * * * *